United States Patent [19]

Fagot

[11] Patent Number: 5,435,589
[45] Date of Patent: Jul. 25, 1995

[54] SKI COMPRISING A BODY AND AT LEAST ONE CAP, A TIP AND/OR A TAIL MANUFACTURED INDEPENDENTLY, AND PROCESS FOR MANUFACTURING SUCH A SKI

[75] Inventor: Jacques Fagot, La Manche, France

[73] Assignee: Skis Rossignol S.A., France

[21] Appl. No.: 104,551

[22] Filed: Aug. 11, 1993

[30] Foreign Application Priority Data

Aug. 24, 1992 [FR] France ................... 92 10338

[51] Int. Cl.$^6$ ................................. A63C 5/12
[52] U.S. Cl. ................... 280/610; 280/809; 425/542
[58] Field of Search ............. 280/601, 602, 609, 610, 280/809, 816; 425/542

[56] References Cited

U.S. PATENT DOCUMENTS

| 1,595,632 | 8/1926 | Taft | 280/601 |
|---|---|---|---|
| 3,066,326 | 12/1962 | Collins | 280/601 X |
| 3,771,805 | 11/1973 | Ishida | |
| 3,876,216 | 4/1975 | Wehr | 280/601 |
| 5,143,394 | 9/1992 | Piana | 280/601 X |
| 5,292,146 | 3/1994 | Palau | 280/809 X |
| 5,310,221 | 5/1994 | Schmidt | 280/809 |
| 5,360,228 | 11/1994 | Palau | 280/809 X |
| 5,397,153 | 3/1995 | Dutaut et al. | 280/809 |

FOREIGN PATENT DOCUMENTS

| 0123635 | 10/1984 | European Pat. Off. |
|---|---|---|
| 0229608 | 7/1987 | European Pat. Off. |
| 0456980 | 11/1991 | European Pat. Off. |
| 0459347 | 12/1991 | European Pat. Off. |
| 2556841 | 6/1977 | Germany |

*Primary Examiner*—Mitchell J. Hill
*Assistant Examiner*—Michael Mar
*Attorney, Agent, or Firm*—Oliff & Berridge

[57] ABSTRACT

In this composite ski, each cap, i.e., tip or tail, comprises at least one recess terminating in an end surface thereof for attachment to the ski body, with a reinforcing frame of the ski body extending longitudinally beyond the ends of the ski body to engage the at least one cap recess. The ski body is then injected with foam made of synthetic material, which constitutes the core of the body and also fills the at least one cap recess thereby forming a composite ski with greater flexibility that is much safer and less susceptible to damage.

6 Claims, 1 Drawing Sheet

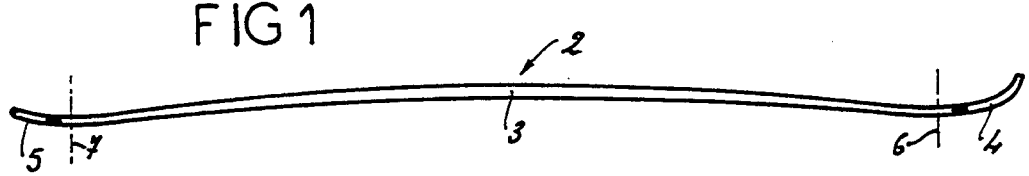
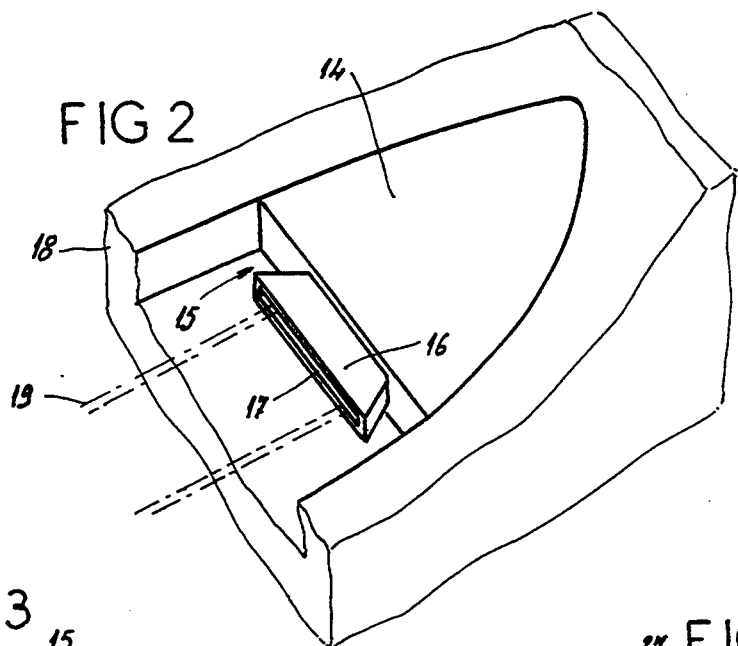
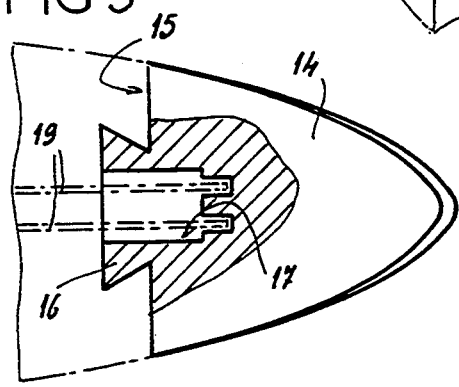
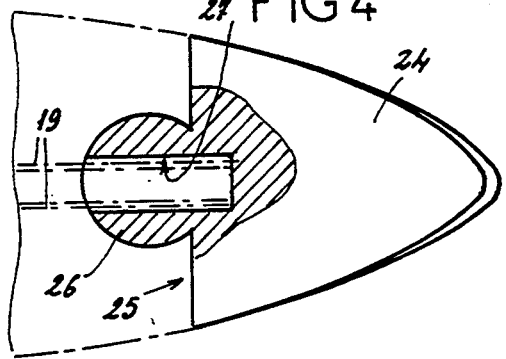
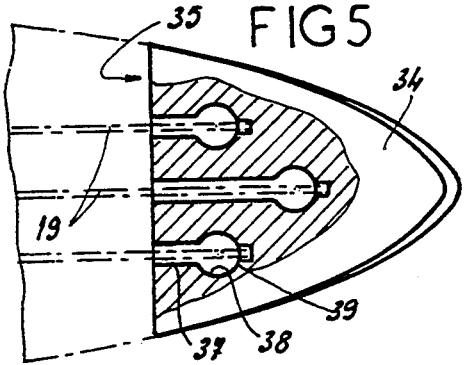
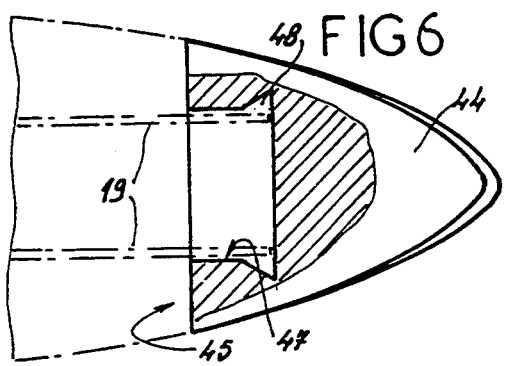

SKI COMPRISING A BODY AND AT LEAST ONE CAP, A TIP AND/OR A TAIL MANUFACTURED INDEPENDENTLY, AND PROCESS FOR MANUFACTURING SUCH A SKI

BACKGROUND OF THE INVENTION

The present invention relates to a ski comprising a body and at least one cap, i.e., a tip element and/or a tail element manufactured independently, and a process for manufacturing said ski.

It is known that skis can be manufactured with the tip having mechanical characteristics different from those of the body of the ski, in particular, to produce greater flexibility thereby promoting safety in the event of impact.

German patent document DE 2,556,841 discloses a ski of traditional design and structure in which the tip incorporates an element made of a material more flexible than the body of the ski between its upper and lower surfaces, while ensuring continuity with the surfaces of the body of the ski.

U.S. Pat. No. 3,876,216 to Wehr discloses a ski whose tip is covered with an element made of a flexible material with a rounded end for safety reasons.

European Patent 0,123,635 discloses a ski comprising a tip made of synthetic material mounted on the front end of the ski, said ski having a short zone bent slightly upward beyond the point of contact of the front of the body of the ski with the snow.

In the case of the latter two references, the respective surfaces of the body of the ski and the tip element intended to come in contact with one another must be carefully prepared to allow proper adjustment favoring attachment by gluing, clipping, or other similar type of assembly. In practice, however, these skis have definite separation limits, especially at the tip. The tip area is subjected to particular stress, both during skiing, when the tip receives impacts that can originate with striking small obstacles, such as pieces of ice, and when handled by the user, when the ski is at risk of falling and the tip hitting the ground. Such impacts eventually result in breakage or displacement of the tip element relative to the body of the ski, resulting at least in formation of a slight gap, which is unattractive and not functional, between the body of the ski and the tip.

SUMMARY OF THE INVENTION

A goal of the invention then, is to provide a ski which can be manufactured industrially, for example by using the techniques of molding synthetic material thereby minimizing the finishing operations.

Another goal of the invention is to provide a perfect connection between the cap and the body of the ski, with this connection being made not only at the outer surfaces to ensure continuity from an appearance standpoint, but also at the structural level to ensure continuity of the mechanical characteristics between the body of the ski and the cap.

Still another goal is to ensure a good fit at the interface between the body and the cap.

Other goals are likewise taken into account by the invention, relating to the safety provided by a cap made of a relatively flexible material, the possibility of shaping the cap without being obliged to perform certain specific operations, and the possibility of altering the inertia of the cap and especially the inertia of the tip area of the ski.

Moreover, while it is ordinarily necessary to limit the magnitude of suspended masses forming the tip in certain ski structures that are especially subject to vibration, it may be advantageous for a ski whose body is much lighter, for instance, when the body of the ski has a foam core made of expanded synthetic material, to provide caps that are heavier in order to promote the precision with which the ski is guided. In the case of skis with very light bodies, the user does not perfectly feel the reactions of the skis on the snow, so the user steers poorly, especially in turns. In order to restore these sensations, it is advantageous to increase the weight at the end(s) of the skis, which can be accomplished by modifying the nature of the materials making up the cap(s).

The ski according to the invention can achieve these several goals. For this purpose, the ski of the invention comprises a body and at least one cap, i.e., a tip and/or tail made independently, which itself determines the shape of the cap as the cap is made in advance, and the body of the ski comprising a foam core made of injected synthetic material provided over at least a portion of its length with at least one reinforcing frame element, wherein:

the caps, whether tip or tail, each have at least one recess terminating at an interface area by which it is connected to the body of the ski;

the frame of the body extends longitudinally beyond the ends of the ski body and is fitted into at least one recess of the cap or caps; and each recess in the cap, terminating at the interface area by which it is connected to the ski body, is also filled with foam made of synthetic material constituting the core of the body, during the operation in which the body is injected.

Each cap is, therefore, linked to the body during the operation involving injection of the foam made of synthetic material into the interior of the body, said foam made of synthetic material filling each recess made in the cap or caps, and surrounding the frame which penetrates the interior of this recess. Thus, when it is removed from the mold, a finished ski is obtained in which the cap or caps have characteristics different from those of the body of the ski but are perfectly integrated therewith. Further, there is continuity of the mechanical characteristics because the frame of the ski body is extended into the interior of the cap or caps.

According to one embodiment of this ski, the surface of each cap that connects to the ski body is flush, with at least one of the recesses terminating at an interface area, the recess comprising an enlarged section near its closed end, thus producing an inseparable assembly with the ski body.

According to another embodiment of this ski, the interface area of each cap connecting to the body of the ski is curvilinear and comprises at least a protruding portion delimiting hollow recesses disposed transversely to the longitudinal axis of the ski body, again producing an inseparable assembly between each cap and the body.

These two embodiments allow the use of molds which, after being filled with foam composed of synthetic material, form the anchoring zones thereby avoiding any risk of the cap and the ski coming apart. Further, the bottom of each recess made in a cap comprises means for positioning the reinforcing frame before the frame is trapped inside the foam made of synthetic material.

According to still another embodiment of this ski, the means for positioning the reinforcing frame comprise blind holes terminating in the bottom of each recess, reserving to engage the ends of the reinforcing framework elements, for example, the ends being in the form of steel wire, carbon fiber, or the like.

The process of manufacturing this ski comprises the steps of producing at least one cap, i.e., a tip and/or a tail, comprising at least one recess terminating in an interface area where the cap connects to the body of the ski, placing each cap in a mold designed to produce the body of the ski, positioning certain component elements of the ski body in the mold while engaging the reinforcing frame elements located in the end portions of the ski body inside the recesses made in the caps, then injecting the foam made of synthetic material to form the core of the ski body and to fill the recesses made in the caps. Then, after curing, the newly formed composite ski is removed from the mold.

BRIEF DESCRIPTION OF THE DRAWINGS

The invention will be clearly understood from the following description with reference to the attached schematic diagrams showing as a nonlimiting example a plurality of embodiments of this ski.

FIG. 1 is a side view of a ski;

FIG. 2 is a perspective view of the front end of the bottom part of a mold designed to make a ski in accordance with the invention, into which a tip element has been introduced;

FIG. 3 is a top view of the tip element of FIG. 2;

FIGS. 4 to 6 are three top views corresponding to the view in FIG. 3, showing various embodiments of the inventive ski.

DETAILED DESCRIPTION OF PREFERRED EMBODIMENTS

FIG. 1 shows, in highly schematic form, a ski 2 viewed from the side and comprising a central part or body 3, a tip element 4, and a tail element 5.

The tip 4 and tail 5 elements are constituted by caps made independently of the ski body 3 and previously thereto, connected to the ski body 3 ahead of the front line of contact 6 of the ski with the snow and behind the rear line of contact 7 of the ski with the snow, respectively.

FIGS. 2 and 3 show a tip element 14 whose end surface 15 for connecting with the ski body 3 forms an interface area comprising a broken-line projecting part 16 in the form of a swallowtail. A recess 17, with a rectangular opening, is provided in broken-line projecting part 16 and in the body of tip element 14.

In practice, to make this ski, tip element 14, obtained previously, is introduced into the bottom of mold 18 which is designed to make the ski body 3. Frame elements, represented schematically by the dot-dashed lines in the drawing and designated by reference numeral 19, designed to reinforce ski body 3 over all or part of its length, are positioned in mold 18 and penetrate recess 17.

The other component elements of the ski, such as the bottom, sides, outer shell, etc. (not shown) are likewise placed in the bottom of the mold 18 by providing a space in the central part. Then the cover (not shown) is placed on the mold 18 bottom.

During the injection of the preferably polyurethane foam which constitutes the core of ski body 3, this foam also penetrates recess 17 and surrounds the frame elements 19 that are placed inside this recess.

After curing (by known means), a finished ski is removed from mold 18, with perfect integration of the body 3 and the cap(s), since there is a continuous framework between the body 3 and the caps. Thus, the mold 18 that constitutes the body 3, likewise anchors the caps.

FIGS. 4–6 show three embodiments of a cap associated with a ski in accordance with the invention.

In the embodiment shown in FIG. 4, tip element 24 has interface area 25 for connection to the ski body 3 and further has a curvilinear projecting part 26 in the shape of a cylindrical section in which a rectangular recess 27 terminates.

In the embodiment shown in FIG. 5, tip element 34 comprises an interface area 35 for connection to the ski body 3 which forms flush against interface area 35, wherein three recesses 37 terminate. Each of said recesses 37 have a part 38 with an enlarged cross-section, enlarged near its closed end. Note that in the bottom of each recess there is a blind hole 39 that serves to accommodate an extension member of frame 19, the extension member of frame 19 comprising a steel wire, carbon fiber, or the like.

In the embodiment shown in FIG. 6, tip element 44 comprises an interface area 45 for connecting to the ski body 3. The interface area 45 is planar and has a rectangular recess 47 that terminates in this planar interface area 45, said recess 47 having two portions 48 enlarged near the bottom of the recess 47.

As indicated by the foregoing, the invention represents a considerable improvement in existing technology by providing a ski whose body and caps can be made of different materials and whose structure allows industrial manufacture under advantageous economic conditions.

What is claimed is:

1. A composite ski comprising a body and at least one cap, said cap being used as at least one of a tip element and a tail element of said ski with said cap being made independently and in advance of said body, and said body comprising an injected synthetic foam core, said foam core being provided over at least a portion of said body with at least one reinforcing frame element disposed therein, wherein said cap comprises at least one recess terminating at an interface area where said cap is joined to said body;

said reinforcing frame disposed within said body has at least one extension member which extends longitudinally beyond said interface area at an end portion of said body a distance sufficient for inserting said extension member into at least one said recess of said cap, and each cap recess, having said at least one extension member inserted therein for joining said cap to said body, is filled with synthetic foam simultaneously as said body is injected with said synthetic foam during manufacture of said composite ski.

2. Ski according to claim 1, wherein said cap interface area is flush with and transverse to a longitudinal axis of said body, with said at least one recess terminating in said interface area, said at least one recess further comprising an enlarged portion located substantially adjacent to a closed end of said at least one recess with said enlarged portion being filled with synthetic foam during injection of said body thereby producing an inseparable assembly.

3. Ski according to claim 1, wherein said cap interface area has at least one of a broken-line projecting part and a curvilinear projecting part delimiting respective hollow recesses with openings disposed transversely to a longitudinal axis of said body and with said hollow recesses being filled with synthetic foam during injection of said body to produce an inseparable assembly.

4. Ski according to claim 2, wherein a bottom portion of said at least one cap recess comprises means for positioning said reinforcing frame before said reinforcing frame is sealed inside said synthetic foam.

5. Ski according to claim 4, wherein said means for positioning said reinforcing frame comprise blind holes terminating in a bottom portion of each recess for securely positioning said inserted reinforcing frame before injection of said synthetic foam.

6. Process for manufacturing a composite ski, comprising the steps of:
  making at least one cap, said cap comprising at least one recess terminating in an interface area for attachment to a ski body;
  placing at least one said cap into a mold shaped for producing said ski body;
  positioning structural elements of said ski body in said mold while inserting reinforcing frame extension members located at end portions of said ski body, which extend beyond said interface area, inside said at least one cap recess;
  injecting foam made of synthetic material to form a core of said ski body and to fill said at least one recess provided in said at least one cap;
  curing said ski body and at least one cap after injection; and
  removing said composite ski from said mold.

* * * * *